United States Patent

Lewis et al.

[15] 3,644,096
[45] Feb. 22, 1972

[54] APPARATUS FOR USE IN A CONTINUOUS FLOW REACTION FOR PRODUCING A MONOMER AND/OR A PROTOPOLYMER

[72] Inventors: Alan E. Lewis; Frederick W. Voigt, Jr., both of Kingsport, Tenn.

[73] Assignee: Eastman Kodak Company, Rochester, N.Y.

[22] Filed: Mar. 30, 1970

[21] Appl. No.: 29,318

Related U.S. Application Data

[62] Division of Ser. No. 752,058, Aug. 12, 1968.

[52] U.S. Cl. ..........................23/263, 260/94.9 P, 260/95 P, 260/475 P, 260/75 M
[51] Int. Cl. .........................................C07c 69/82, B01j 1/00
[58] Field of Search ................23/263, 285, 283, 284, 260, 23/288 E; 260/94.9 P, 95 R, 96, 475 P, 75 M

[56] References Cited

UNITED STATES PATENTS

| | | | |
|---|---|---|---|
| 2,822,373 | 2/1958 | Beck | 23/260 X |
| 2,377,435 | 6/1945 | McKee | 23/285 X |
| 2,517,690 | 8/1950 | Lienhart | 23/260 X |
| 2,776,284 | 1/1957 | Hood | 23/260 X |
| 3,227,743 | 1/1966 | Shaw et al | 23/263 X |

*Primary Examiner*—James H. Tayman, Jr.
*Attorney*—William T. French and Malcolm G. Dunn

[57] ABSTRACT

Apparatus by which an esterification precursor is continuously converted to an esterification reaction product liquid by admixing a feed stream of the precursor into and with a circulating stream of the product liquid, heating the admixture to vaporize a low-boiling component, the heating being at a sufficient temperature and for a sufficient time to convert the precursor to the product liquid, and continuously withdrawing a stream of the product liquid from the circulating admixture.

3 Claims, 3 Drawing Figures

FREDRICK W. VOIGT, JR
ALAN E. LEWIS
INVENTORS

BY Malcolm H. Dunn

ATTORNEYS

FREDRICK W. VOIGT, JR.
ALAN E. LEWIS
  INVENTORS

APPARATUS FOR USE IN A CONTINUOUS FLOW REACTION FOR PRODUCING A MONOMER AND/OR A PROTOPOLYMER

This is a division of our copending application Ser. No. 752,058, filed Aug. 12, 1968.

The present invention is directed to apparatus for use in continuously producing a monomer and or a protopolymeric product, and is particularly directed to apparatus by which continuous flow esterification of a liquid material may occur.

The term monomer is used herein in its broadest sense to include products of condensation reactions without regard to whether they can be further polymerized and thus includes various mono- and diesters as well as polyester monomers. The word esterification is used herein in its broad sense to include direct esterification of an acid with a hydroxy compound (an alcohol or glycol), ester exchange of an ester with a hydroxy compound to form a different ester, and polycondensation of a monomer or lower molecular weight protopolymer to a higher molecular weight protopolymer. We use the term esterification reaction product to include monomers of the class described and protopolymers, the latter being polymeric products of intermediate molecular weight between that of a monomer and an ultimate high molecular weight polyester suitable for spinning as a manmade fiber.

In the production of esterification reaction products large vapor loads of alcohol or glycol are generated. Problems associated with various types of esterification processes are similar and include (1) provision of heat to the system necessary to provide the heat of vaporization of the vaporous byproducts; (2) handling the vaporous byproducts so that liquid product gasing or foaming is eliminated; (3) removing the vaporous byproduct from the liquid product; (4) providing the required liquid holdup time for chemical reaction; and (5) providing a suitably agitated system so as to prevent the settling or agglomeration of any suspended solid additive material without the need for mechanical agitation equipment while (6) minimizing the loss of product material vaporized along with the low-boiling component. All of the above-stated problems become increasingly difficult to accomplish simultaneously as large-scale commercial applications are considered.

An object of the invention is to provide an apparatus for practicing a method by which esterification may be accomplished for resolving one or more of the above-stated problems, particularly when considering large commercial scale production.

It should be recognized that the scope of the invention is applicable to other condensation polymers as well as that of poly(ethylene terephthalate), even though the latter will be mentioned by way of example throughout this disclosure. In other words, the principles of the invention are applicable broadly to all types of esterification reactions, including direct esterification and ester exchange, in which a byproduct is evolved, such as water or an alcohol, which is lower boiling than the reactants and the desired product. An example is the reaction of phthalic acid with 2-ethylhexanol to produce bis(2-ethylhexyl)phthalate (also know as DOP) as the desired esterification product and water as the byproduct which is removed from the reaction zone. Other examples include preparations of various esters and diesters by reaction of an acid or ester with an alcohol or glycol and evolving byproduct water or a volatile alcohol boiling lower than the reactants and the desired product.

An important consideration in the production of any esterification monomer or protopolymer involves avoidance of thermal degradation that will have an effect on the color of the ultimate product obtained. In order to minimize the color, it is highly desirable to employ methods and apparatus which will result in nonexcessive residence times and hence exposure to heat, and nonexcessive heat transfer wall temperatures, since such temperatures and exposure to heat will promote thermal degrading and color-forming reactions. It is therefore another object to provide an apparatus for practicing a method by which a minimum of thermal degradation and color formation occurs.

Still another object is to provide a reactor apparatus for use in practice of a method in the production of an esterification reaction product liquid having a degree of polymerization in the range of 1 to about 20 from a precursor material that is introduced and admixed as a feed stream into a rapid circulating reacting liquid stream that has been converted to the desired esterification reaction product liquid, the admixture circulating through a heating zone for imparting to the circulating admixture the desired amount of heat, the heat vaporizing the low-boiling component of the liquid material, and the reaction itself evolving still more of the vaporized component, the circulating admixture passing into a first disengaging chamber for removal of the vaporized component from the liquid material and then into a large disengaging chamber for further removal of the vaporized component from the reactor apparatus the larger disengaging chamber serving also to contain the liquid therein at a predetermined liquid level, and the amount of liquid material in excess of the liquid level being withdrawn from the circulating admixture as the product liquid, and the remaining liquid material being maintained in circulation for further admixing of a fresh feed of precursor liquid.

It is often desirable to produce desired effects in the ultimate product, such as the aforementioned manmade fiber product, by the use of additives such as dye-receptors, slip agents, optical brighteners, and delusterants such as titanium dioxide, silica, barium sulfate, zirconium dioxide and aluminum trioxide; the titanium dioxide, for example, imparting a delustered appearance to what might otherwise be a bright fiber. In the instance of the delusterant, it may be introduced at the spinning stage of the fiber, or at one of the reaction phases. One problem with a delusterant, such as titanium dioxide ($TiO_2$), is that it as well as many other additives having similar characteristics such as being insoluble in the liquid materials concerned will tend to agglomerate and settle out or collect in one portion of the liquid material but not in another portion, when the objective is to maintain a substantially uniform suspension of the additive well dispersed and unagglomerated throughout the ultimate product. When introducing $TiO_2$, for example, in conventional esterification or prepolymerization phases, in which cascade tray reactors and the like are employed, the liquid material being reacted is subjected to such mild agitation and is of such low molecular weight that the particles of the $TiO_2$ will agglomerate and settle in still areas of the reaction zone and on horizontal surfaces of such trays and will not remain in uniform unagglomerated suspension in the liquid material.

A further object, therefore, is to provide an apparatus for practice of a method as previously described wherein additives such as delusterants and optical brighteners, are mixed in a liquid feed stream with the precursor material, the liquid being subsequently admixed into the rapid circulating stream of reacting liquid material, the velocities of the circulation and subsequent recirculation and admixing being such as to obtain and maintain substantially uniform unagglomerated suspension of the additives through the product liquid that subsequently passes into the final polycondensation phase.

A still further object is to provide an apparatus for continuously converting a precursor material to a protopolymeric or product liquid by which apparatus the liquid comprising the precursor material is admixed at a predetermined flow rate with a circulating liquid stream which is the product liquid and wherein the average residence time for the precursor to remain in the circulating liquid stream for such conversion is equal to the constant mass of liquid in the circulating admixture divided by the predetermined flow rate of the precursor being admixed.

Another still further object is to provide an apparatus for practice of the method as previously described wherein the esterification reaction product liquid yield is increased by recovering and returning to the product liquid in the larger disengaging chamber as much as practicably possible the portion of the product liquid that is undesirably vaporized, such as monomer.

Other objects inherent in the nature of the invention will become apparent to those skilled in the art to which this invention pertains from the drawings and the description in the specification.

Figure 1:
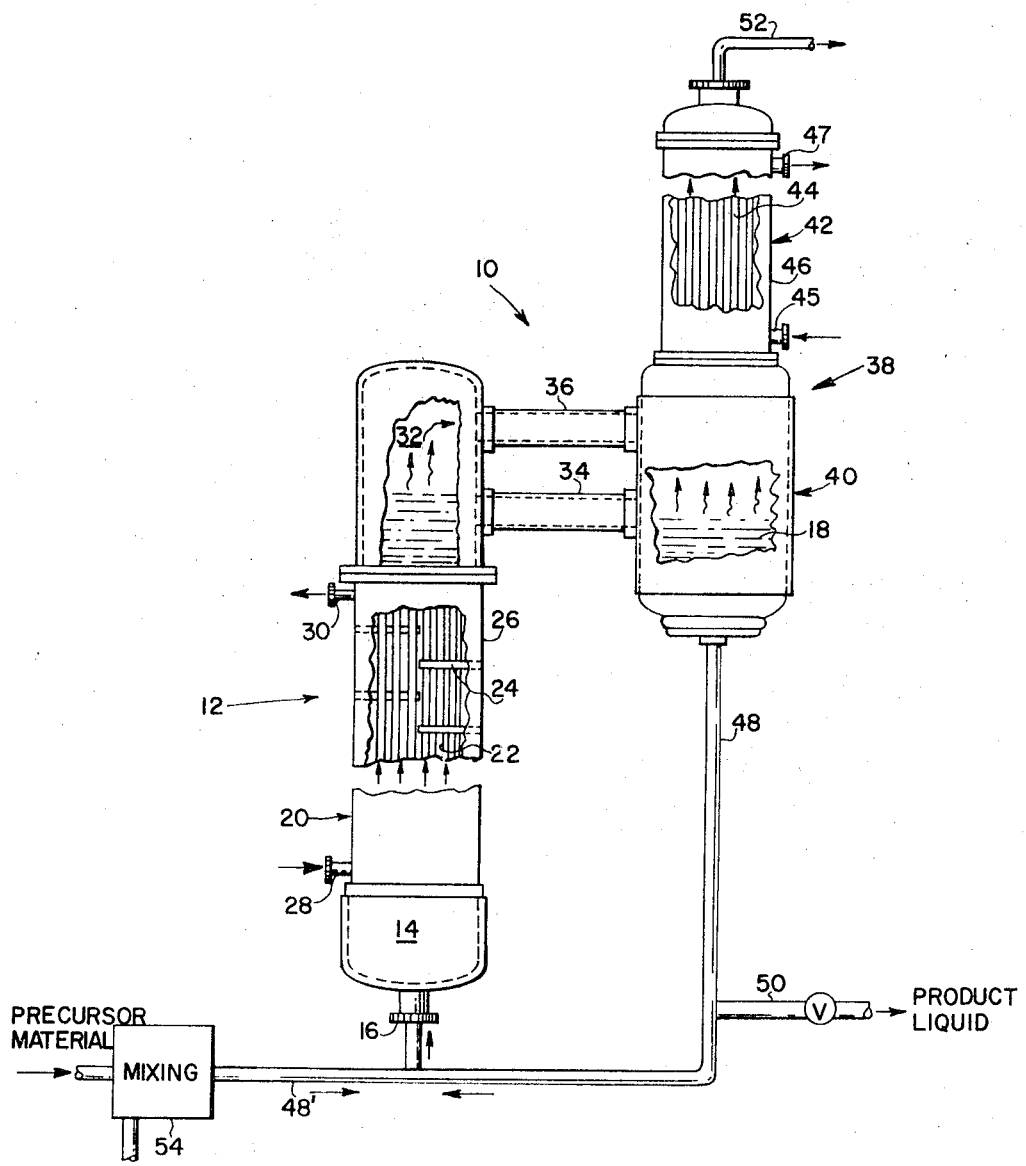
FIG. 1 is an elevational view of an apparatus that may be used in practicing the method of the invention.

In reference to FIG. 1, the reactor apparatus 10 has no moving parts to obtain circulation and recirculation of the liquid stream but rather depends on vaporization of a low-boiling component, preferably in a temperature range of about 165° to 320° C. in a pressure range that can extend from about 50 mm. of Hg absolute (subatmospheric) to as high as 50 pounds per square inch gauge. It should be recognized, however, that with some polyester materials such as poly(ethylene terephthalate), it may be deemed desirable that this temperature range should extend no higher than 260° to 270° C. to avoid deleterious side reactions. As illustrated, the reactor apparatus comprises two generally cylindrical vessels joined for circulation and recirculation of the liquid material by suitable conduits, the long axes of the vessel being in vertical position.

The first cylindrical vessel 12 is shown as having three main sections. The first section at the lower part of the vessel is the transition chamber 14 which has at its lower end an inlet 16 through which the precursor liquid feed stream 18 is introduced in the first vessel. The second section, intermediate to the two other sections, is the heat exchange section 20 which has a bundle of vertically disposed tubes 22, tube supports 24 and the shell 26 that encompasses the tubes and is adapted to contain for circulation therethrough and around the tubes a suitable heated medium such as heated Dowtherm oil. The inlet for the heated medium is shown at 28 and the outlet is shown at 30. The third and uppermost section is a first disengaging chamber 32 in which removal of a low-boiling component from the liquid material occurs. A pair of upper conduits 34, 36 extend from the disengaging chamber 32 to the second generally cylindrical vessel 38 for flow between the vessels of the vaporized component and the liquid material.

The second cylindrical vessel 38 preferably has two sections for reasons which will become apparent. The first section at the lower part of the vessel is a disengaging chamber 40 that is larger than the disengaging chamber 32 in the first vessel 12. The disengaging chamber 40 also serves to contain the liquid material at a predetermined liquid level. The second and uppermost section of the vessel is a partial condenser 42 that is in direct communication with the upper part of disengaging chamber 40. The partial condenser 42 has a bundle of vertically disposed tubes 44, and a shell 46 that encompasses the tubes and is adapted to contain for circulation therethrough and around the tubes a suitable cooling medium such as water or steam condensate, for example, which may enter the shell side of the partial condenser 42 through inlet 45 and leave the condenser at outlet 47. The lower part of the disengaging chamber 40 is connected by a lower conduit 48 that leads to the inlet 16 at the lower end of the first cylindrical vessel 12.

Figure 2:
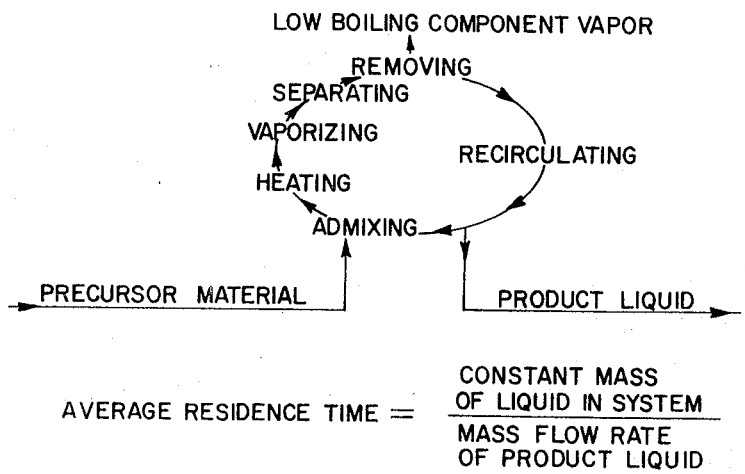
FIG. 2 is a diagram of a flow scheme for the conversion of the precursor material to the product liquid.

In reference to the drawings and particularly to the diagrams of the flow schemes illustrated in FIGS. 2 and 3, the operation will now be described. The incoming liquid material or precursor liquid 18 is introduced as a feed stream through a feedline conduit 48' into inlet 16 at the lower end of the first vessel 12 to be admixed in transition chamber 14 with a liquid stream that is circulating from the second vessel 38, the circulating liquid stream being the desired esterification reaction product liquid. The admixture is accomplished at a volume ratio of about 1 part precursor liquid to 10 to 500 parts of the circulating liquid stream; thus it should be apparent that the admixture will be thorough.

The circulating admixture then passes upwardly at a rapid rate in and through the tubes 22 of the heating exchange section so that the residence time in this part of the apparatus will be extremely small. The heat imparted to the liquid material is sufficient to vaporize a portion of the circulating admixture or the low-boiling component, such as methanol as is the product in the instance of ester exchange reaction between dimethyl terephthalate and 1,4-cyclohexanedimethanol, or ethylene glycol as in the instance of esterification reaction of monomer to form poly(ethylene terephthalate) protopolymer. In the latter instance, the ethylene glycol is the primary low-boiling component being vaporized with inclusion of smaller amounts of diethylene glycol, some monomer that also becomes vaporized and some other components of still smaller percentages. The heated and partially vaporized circulating admixture is in part forced up through the tubes by the weight of the heavier circulating liquid stream coming from the second vessel 38. Also the vaporized low-boiling component serves to push the circulating admixture up through such tubes.

Upon the circulating admixture reaching the first disengaging chamber 32 located at the upper end of vessel 12, there is a first removal of the vaporized low-boiling component from the liquid material. The circulating admixture and a part of the vaporized component as well as the vaporized component by itself flows, respectively, through the upper conduits 34, 36 leading into the second and larger disengaging chamber 40. In this latter chamber the vaporized low-boiling component, ethylene glycol as used in the above example, and the low-boiling component evolved from the reaction, also ethylene glycol as used in the example, are removed from the liquid material and removed from the reactor apparatus through the partial condenser 42.

In order to maintain a desired predetermined liquid level in the disengaging chamber 40 a suitable level controller (not shown) may be used. The excess of the admixture over the predetermined liquid level will subsequently flow from the reactor apparatus as the product liquid through conduit 50 for subsequent reaction in apparatus (not shown) leading to the production of the ultimate polymer desired. A balance is maintained between the input of the precursor liquid feed stream to the reactor apparatus and the output of the product liquid from the apparatus. This balance, which is adjusted in a predetermined manner, will determine the average residence time of the precursor in the circulating liquid stream as it circulates and recirculates through the two vessels. Thus the average residence time will be equal to the constant mass of the liquid in the system divided by the mass flow rate of the product liquid (see FIG. 2). The average residence time may also be increased by raising the level in chamber 40, decreasing rate of flow of precursor liquid feed stream to the apparatus, or both. Thus it may now be apparent that the liquid level in the apparatus adjusts the constant mass of liquid in the system. The higher the level, the greater the mass in proportion. To state it in a different manner the amount of non-low-boiling material fed into the system will determine the amount of withdrawal of the product liquid.

In the preparation of protopolymer in accordance with the invention, some smaller amounts of monomer will also be vaporized along with the ethylene glycol of the example in the heat transfer section. In order to minimize or reduce loss of this monomer in vapor form from the reactor, the vaporized component flows into and through the tubes 44 of the partial condenser 42, and a large portion of the vaporized monomer may be condensed as a liquid on the lower surfaces of the tubes 44 to fall in return to the liquid material in chamber 40. The cooling medium for the partial condenser, such as a cooling medium of steam condensate, should be of a temperature low enough to condense the vaporized monomer as a liquid but not low enough to condense the vaporized low-boiling component such as ethylene glycol before removal of such vaporized component from the reactor apparatus at the top of the second vessel at 52. It should be apparent that if a still greater reduction of monomer loss is desired, a distillation column may be used in place of the partial condenser.

Figure 3:
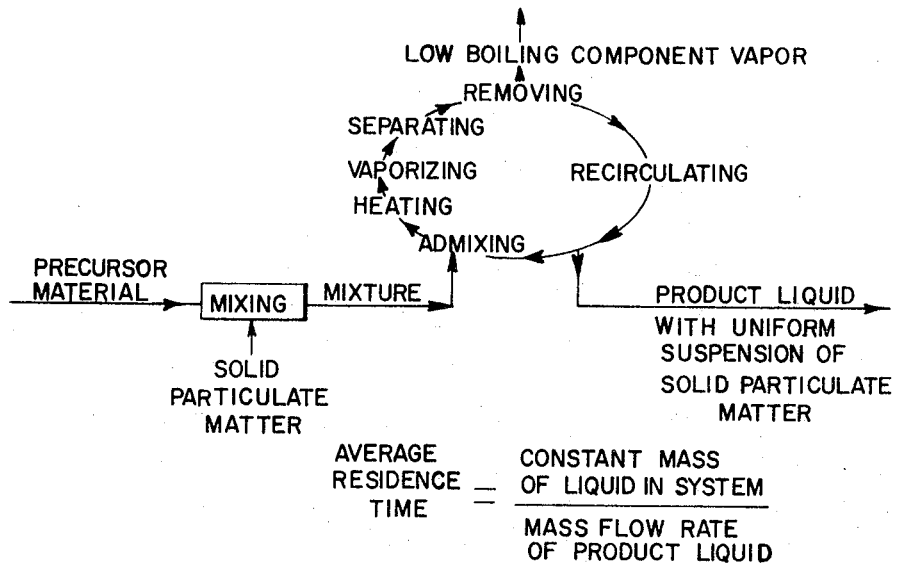
FIG. 3 is a diagram similar to that of FIG. 2 but incorporating a mixer for addition of solid particulate matter and other additives.

In reference to FIG. 1 and FIG. 3, an inline mixer 54 may be positioned along the path of the conduit 48 so that solid particulate matter, optical brighteners, and the like may be added as desired by mixing with the incoming precursor material 18. Due to the rapid circulation of the circulating admixture and particularly in the instance of protopolymer formation phase wherein the relative viscosity of the liquid material increases, the solid particulate matter will remain in uniform unagglomerated suspension. The precursor liquid feed stream is of relatively low viscosity, and as previously mentioned in connection with the protopolymer formation phase, may be of about 1 to 5 centipoises. As the precursor liquid feed stream and the solid particulate matter mixture enter the reactor apparatus the viscosity will increase practically instantaneously since the circulating stream with which the mixture is admixed comprises the product liquid, which previously indicated, may be of relatively higher viscosity, as in the range of about 100 to 200 centipoises in the case of the preparation of a protopolymer of poly(ethylene terephthalate) at 260° C. and 100 mm. Hg absolute. The relatively higher viscosity product liquid will thus tend to maintain the uniform unagglomerated suspension of the particulate matter therein as the product liquid goes to further operations (not shown) involving production of the ultimate desired condensation polymer.

Another advantage that should be apparent is the elimination of separate pumps and agitation equipment (other than the inline mixer for introduction of additives).

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A continuous flow reactor for production of an esterification product liquid from a precursor material, said reactor comprising:

a vessel adapted to receive a stream of heated liquid for reaction therein, the reaction including the evolving of a vaporous predetermined low-boiling component and the forming of a desired esterification product, means separate from said vessel and adapted for heating said liquid material prior to its receipt in said vessel so that the heat will promote reaction of a liquid material when in said vessel, said heating means being adapted to raise the temperature of said liquid material sufficiently to vaporize said low-boiling component and comprising a plurality of vertical tubes adapted to conduct a flow therethrough of said liquid material, and an enclosed chamber surrounding said tubes and adapted to receive therein a heated medium for imparting heat to the liquid material flowing through said tubes;

upper conduit means connecting said vessel and said heating means and adapted for conducting a heated stream from the heating means to the vessel and lower conduit means for conducting liquid from said vessel to the heating means;

a feedline for introducing fresh liquid feed into said lower conduit means;

means for removing said vaporized low-boiling component from said reactor vessel and including a first disengaging chamber at the upper end of said heating means and a second disengaging chamber at the upper portion of said vessel, the two disengaging chambers being connected together by said upper conduit means, and a partial condenser for condensing vaporized desired esterification product from said vaporized low-boiling component and returning said product to said vessel; and further means in said lower conduit means for withdrawing from said circulation stream a desired esterification product liquid.

2. A continuous flow reactor as defined in claim 1, and wherein said lower conduit means is positioned to conduct feed liquid into a transition chamber located at the lower end of said plurality of tubes and in communication with the opening in the tubes.

3. A continuous flow reactor as defined in claim 1, and wherein said feedline includes an inline mixer adapted to introduce additives into the liquid feed stream.

* * * * *

UNITED STATES PATENT OFFICE
CERTIFICATE OF CORRECTION

Patent No. 3,644,096                      Dated February 22, 1972

Inventor(s) Alan E. Lewis and Frederick W. Voigt, Jr.

It is certified that error appears in the above-identified patent and that said Letters Patent are hereby corrected as shown below:

Column 1, line 57, "know" should be ---known---.

Column 2, line 14, "large" should be ---larger---.

Claim 2, lines 4 and 5, "opening" should be ---openings---.

Signed and sealed this 26th day of September 1972.

(SEAL)
Attest:

EDWARD M. FLETCHER, JR.
Attesting Officer

ROBERT GOTTSCHALK
Commissioner of Patents